United States Patent Office 3,809,631
Patented May 7, 1974

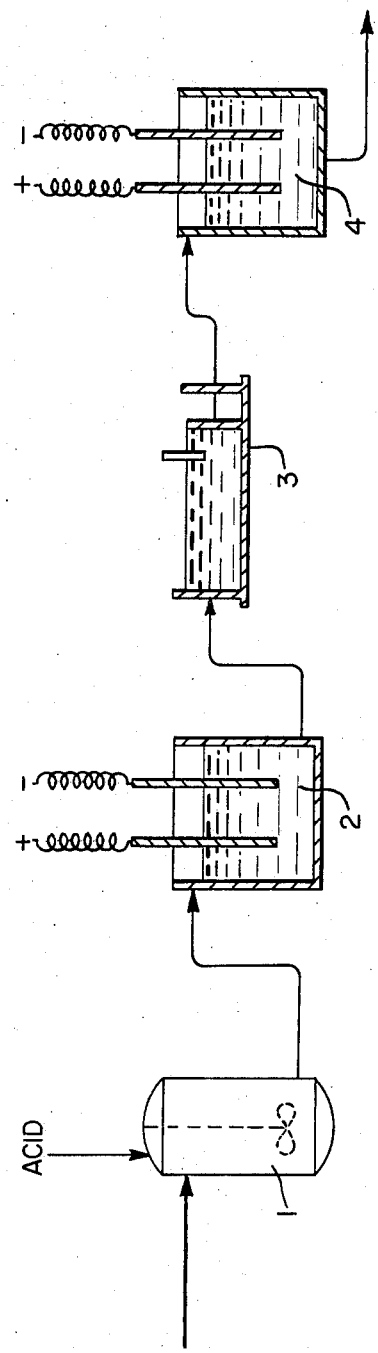

3,809,631
METHOD FOR TREATING OIL-CONTAINING WASTES
Masanori Ohta, 55 Takehana-Nishinokuchi-cho, Yamashina, Higashiyama-ku, Kyoto-shi, Kyoto-fu, Japan
Filed Mar. 8, 1973, Ser. No. 339,131
Claims priority, application Japan, Mar. 9, 1972, 47/23,558
Int. Cl. C02c 5/12
U.S. Cl. 204—149          2 Claims

ABSTRACT OF THE DISCLOSURE

A method for treating industrial wastes containing oils and surfactants, which comprises adjusting the pH of such wastes to 3 or less, subjecting the wastes to an electrolytic treatment using an anode composed of an acid-resistant electrode material and a cathode composed of an ordinary electrode material thereby separating the oil phase from the aqueous phase having the surfactants dissolved therein, and then subjecting the aqueous phase separated from the oil phase to an electrolytic treatment using an anode and a cathode composed of aluminum thereby precipitating the surfactants as sludge separated from water.

BACKGROUND OF THE INVENTION

This invention relates to a process for the purification of emulsified wastes containing oils and surfactants. More particularly, this invention relates to a method for separating oils and surfactants individually from wastes containing oils and surfactants, for instance, wastes discharged from machine factories or steel foundries.

Wastes discharged from machine factories and steel foundries contain a considerable amount of surfactants in addition to machine oils such as cutting oils and rolling oils. Accordingly, when such wastes are thrown away into sewages, emulsion is formed to cause environmental pollution in the rivers and seas.

As the method for treating oil-containing wastes, there has been known, for instance, a process employing an oil separator, e.g., a gravity separator. However, this method is defective in that separation of emulsified oils or solutes cannot be accomplished completely. On the other hand, processes wherein emulsifiable substances in wastes are decomposed in advance by centrifugal separation or chemical treatments and then the wastes are passed through the separator have been proposed. However, these processes require the use of special treating chemicals or large-scale equipment and, therefore, such processes are not practical from the economical viewpoint. Furthermore, it has been found that these known processes are not effective at all for treating wastes containing surfactants as well as oils.

Thus, no process capable of treating effectively emulsified wastes containing both oils and surfactants has been known in the art.

BRIEF SUMMARY OF THE INVENTION

It is, therefore, a primary object of this invention to provide an effective and practically operable process for the purification treatment of wastes containing oils and surfactants.

It is another object of this invention to provide a method for treating wastes containing oils and surfactants, according to which oils and surfactants can be effectively separated from such wastes.

It is a further object of this invention to provide a method for the two-staged electrolytic treatment for separating oils and surfactants individually from wastes containing the oils and the surfactants.

Other and further objects, features and advantages of the invention will appear more fully from the following description. In the drawing, the single figure is a simplified flow-sheet illustrating the process of this invention.

DETAILED DESCRIPTION OF THE INVENTION

As is shown in the drawing, a waste to be treated is introduced into a conditioner 1 where the pH of the waste is adjusted to 3 or less with the use of an acid, for example, sulfuric acid. Then, the waste is forwarded to a first electrolytic tank 2 and the first-stage electrolysis is conducted. Since acid residues are generated at this first-stage electrolysis, an anode of the first electrolytic tank should be composed of an acid-resistant electrode material for protecting the anode from attack of such acid residues. As such acid-resistant electrode material, there can be mentioned noble metals such as gold, silver and platinum, but the use of a titanium-lead oxide composite electrode is especially preferred because it is not expensive and has a good durability. As regards the cathode, the kind of the electrode-constituting material is not particularly critical, and an ordinary electrode material, for example, carbon or ion, can freely be chosen. As used above, the term "lead oxide" is not intended to be limited to PbO, i.e., lead monoxide. Other lead oxides used as electrode material can, of course, be used in this invention. Such lead oxides include $Pb_3O_4$ and $PbO_2$. In terms of solubility in acids, lead dioxide (or lead peroxide $PbO_2$) is most preferred.

By the first-stage electrolytic treatment, the starting waste is separated into an oil phase and an opaque aqueous phase containing surfactants. The thus formed mixed liquor is then forwarded to an oil separator 3 where the oily phase is separated from the aqueous phase. Only the aqueous phase is allowed to enter in a second electrolytic tank 4 where the second-stage electrolysis is carried out. This electrolytic treatment is effected with the use of pair of aluminum electrodes. In this rase, it is preferable that the pH of the aqueous phase is adjusted appropriately depending on the kind of surfactants contained therein. In case the surfactant contained is an anionic one, the pH is adjusted to 3 or less. In the case of a cationic surfactant, the pH is adjusted to 7 or more. In the case of a non-ionic surfactant, the pH is adjusted within a neutral range. When the kind of surfactant contained is unknown, it is preferred that the pH is adjusted to 6 or 8.

By the second-stage electrolytic treatment, the surfactants are precipitated as a sludge which is then removed by filtration, centrifugal separation or the like. Thus, clear water substantially free of surfactants can be obtained.

Electrolytic conditions adopted in the method of this invention vary depending on the composition of the waste to be treated and the amount thereof. In general, however, the electrolysis is carried out at a voltage of 2–50 v. and a current intensity of 10 ma.–100 a. It is essential to conduct the first-stage electrolysis by employing direct current, but the second-stage electrolysis may be conducted using either direct or alternating current. In general, the electrolytic time can be shortened by increasing the current intensity but, ordinarily, the treatment conditions are selected so that the electrolysis is completed in about 1–5 minutes. During the electrolytic operation, it is advantageous that the liquid is continuously moved by air blowing or agitation, thereby removing the electrolytic product attached to the surface of the electrodes.

In order to conduct the electrolytic treatment efficiently, it is recommended to employ an electrolytic tank composed of an anti-corrosion vessel in which a plurality of pairs of electrode plates are disposed. The two-stage electrolytic treatment may be carried out in sequence in the same tank, if desired, instead of in separate tanks as described above.

According to the method of this invention, a factory waste containing at least 1% of oil and at least 0.3% of surfactant is treated to reduce the oil content to 10 p.p.m. or less and the surfactant content to 1 p.p.m. or less. Furthermore, suspended inorganic matters, metal powders and other impurities can advantageously be removed as sludge simultaneously with the removal of oils and surfactants.

This invention will now be illustrated in more detail by way of the following example.

Example

In a 1-liter capacity glass beaker is placed 500 ml. of a waste discharged from the rolling step, which contains 8000 p.p.m. of oils and 2000 p.p.m. of surfactants. The pH of the waste is adjusted to about 3. Then, the waste is subjected to the electrolytic treatment using DC current of 6 v. and a current intensity of 50 ma. for two minutes, with the distance between the electrodes being adjusted to 40 mm., while blowing air into the vessel from the bottom portion. An electrode formed by evaporation-depositing lead oxide on a titanium net is employed as an anode, and a carbon electrode is used as a cathode.

The treated waste is transferred to a separation funnel and allowed to stand for a while. The oil phase is separated as an upper layer from the lower layer of an opaque aqueous phase. Only the lower layer is transferred into the above beaker, and the electrodes are replaced by a pair of aluminum electrodes. The pH is adjusted to 7.5 by addition of caustic soda and the electrolytic treatment is then carried out under the same conditions as described above. By this treatment, the surfactants are precipitated as a greyish white sludge, and the aqueous phase becomes transparent. After removing the sludge by filtration, the oil content, the surfactant content and the COD value are determined with respect to the remaining purified water. The oil content is about 10 p.p.m. and the COD value is 5, while the presence of surfactants is not detected.

What is claimed is:

1. A process for treating industrial wastes containing oils and surfactants, which comprises adjusting the pH of a waste to 3 or less, subjecting the waste to an electrolytic treatment using an anode composed of an acid-resistant electrode material and a cathode composed of an ordinary electrode material thereby separating the oil phase from the aqueous phase having surfactants dissolved therein, and then subjecting the aqueous phase separated from the oil phase to an electrolytic treatment using a pair of electrodes composed of aluminum thereby precipitating the surfactants as sludge separated from water.

2. A process according to claim 1 wherein a titanium-lead oxide composite electrode is employed as the acid-resistant anode in the first-stage electrolytic treatment.

References Cited

UNITED STATES PATENTS

| | | | |
|---|---|---|---|
| 558,052 | 4/1896 | Encke et al. | 204—149 X |
| 966,025 | 8/1910 | Lautzenhiser et al. | 204—149 |
| 3,347,786 | 10/1967 | Baer et al. | 204—149 X |

JOHN H. MACK, Primary Examiner

A. C. PRESCOTT, Assistant Examiner

U.S. Cl. X.R.

204—152